(12) United States Patent
Oliveira et al.

(10) Patent No.: US 12,418,586 B2
(45) Date of Patent: Sep. 16, 2025

(54) AVIONICS UNIT

(71) Applicant: AIRBUS OPERATIONS LIMITED, Bristol (GB)

(72) Inventors: Hugo R. Oliveira, Bristol (GB); Victor Boeing Ribeiro, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 72 days.

(21) Appl. No.: 17/440,708

(22) PCT Filed: Jul. 30, 2020

(86) PCT No.: PCT/EP2020/071529
§ 371 (c)(1),
(2) Date: Sep. 17, 2021

(87) PCT Pub. No.: WO2021/023618
PCT Pub. Date: Feb. 11, 2021

(65) Prior Publication Data
US 2025/0039266 A1 Jan. 30, 2025

(30) Foreign Application Priority Data
Aug. 2, 2019 (GB) ...................... 1911106

(51) Int. Cl.
*B64D 45/00* (2006.01)
*B60T 7/04* (2006.01)
*H04L 67/12* (2022.01)

(52) U.S. Cl.
CPC .............. *H04L 67/12* (2013.01); *B60T 7/042* (2013.01); *B64D 45/00* (2013.01); *B64D 2045/0085* (2013.01)

(58) Field of Classification Search
CPC ......... H04L 67/12; B60T 7/042; B64D 45/00; B64D 2045/0085
See application file for complete search history.

(56) References Cited

U.S. PATENT DOCUMENTS 7,009,601 B1 3/2006 Sherlock et al.
9,972,143 B1 5/2018 Garai et al.
(Continued)

FOREIGN PATENT DOCUMENTS

| EP | 2 105 364 | 9/2009 |
| GB | 2468553 | 9/2010 |
| JP | H0314795 | 1/1991 |

OTHER PUBLICATIONS

International Search Report for PCT/EP2020/071529 mailed Oct. 20, 2020, 3 pages.
(Continued)

*Primary Examiner* — Mathew Franklin Gordon
(74) *Attorney, Agent, or Firm* — Nixon & Vanderhye P.C.

(57) ABSTRACT

An avionics unit for an aircraft including a communications interface arranged to interface with one or more other avionics units. The communication interface is arranged to transmit a signal having a first state indicating a fault condition of the avionics unit to the one or more other avionics units if the first state persists for a predetermined time. A processor is arranged to modulate an output at the communication interface to provide a modulated signal to indicate a characteristic of a present state of the avionics unit with respect to the fault condition. The modulated signal includes the first state and a second state, different from the first state, wherein, in the modulated signal, the first state has a duration less than the predetermined time.

18 Claims, 5 Drawing Sheets

(56) References Cited

U.S. PATENT DOCUMENTS

| | | |
|---|---|---|
| 2004/0239173 A1 | 12/2004 | Williams et al. |
| 2008/0133072 A1 | 6/2008 | Yamamoto et al. |
| 2016/0299512 A1 | 10/2016 | Summers et al. |
| 2018/0190048 A1 | 7/2018 | Safa-Bakhsh |
| 2018/0307231 A1 | 10/2018 | Sorton et al. |
| 2019/0102957 A1 | 4/2019 | Huber et al. |

OTHER PUBLICATIONS

Written Opinion of the ISA for PCT/EP2020/071529 mailed Oct. 20, 2020, 9 pages.
Combined Search and Examination Report for GB1911106.1 mailed Jan. 29, 2020, 7 pages.
Search Report for GB1909386.3 mailed Mar. 3, 2020, 9 pages.

100

300

500

AVIONICS UNIT

RELATED APPLICATIONS

This application is the U.S. national phase of International Application No. PCT/EP2020/071529 filed Jul. 30, 2020, which designated the U.S. and claims priority to United Kingdom Application No. GB 1911106.1, filed Aug. 2, 2019, the entire contents of each of which are hereby incorporated by reference.

TECHNICAL FIELD

The present invention relates to avionics units for aircraft, and methods of communication between avionics units.

BACKGROUND

Modern aircraft are provided with avionics units that perform various monitoring and control tasks. Examples of avionics units include, for example, communications systems, navigation systems, monitoring systems, fuel control systems, collision avoidance systems, weather monitoring systems, engine management systems, and flight control systems. Flight control systems may include, for example, systems for controlling and/or monitoring control surfaces of the aircraft (such as ailerons, elevators, rudder, flaps, slats, spoilers, landing gear, and wheel brakes).

Some avionics units can determine that they have developed a fault and indicate a fault condition to other components of the aircraft, such as other avionics units or to, for example, warning indicators displayed in the cockpit of the aircraft. For example, avionics units may include a communications interface arranged to transmit a discrete (e.g. binary) signal indicating whether there is a fault condition. Such fault indications are transmitted once the fault condition has arisen and, in some examples, may be interpreted as representing a fault condition of the transmitting avionics unit if the signal persist for a predetermined time. However, such discrete signals are not capable of indicating the present state of the avionics unit prior to a fault condition arising and, for example, are not able to indicate how close the avionics unit is to reaching a failure condition.

The present invention mitigates the above-mentioned problems and accordingly may provide a simplified solution for obtaining data for a health monitoring in aircraft

SUMMARY

A first aspect of the present invention provides an avionics unit, the avionics unit comprising: a communications interface arranged to interface with one or more other avionics units, the communication interface being arranged to transmit a discrete signal having a first state, wherein the discrete signal indicates a fault condition of the avionics unit to the one or more other avionics units if the first state persists for a predetermined time; and a processor arranged to modulate an output at the communication interface to provide a modulated signal to indicate a characteristic of a present state of the avionics unit with respect to the fault condition, the modulated signal comprising the first state and a second state, different from the first state, wherein, in the modulated signal, the first state has a duration less than the predetermined time.

Optionally, the predetermined time is a time after which, upon continuously receiving a signal having the first state, the one or more further avionics units is arranged to perform an action in response to the fault condition.

Optionally, the characteristic is a measure of a separation between the present state of the avionics unit and the fault condition.

Optionally, the measure indicates a time between a present time and a time at which a fault condition is expected to occur.

Optionally, the avionics unit is arranged to receive signals from a plurality of a brake pedal position sensors, and the characteristic is determined on the basis of a comparison between a signal received from a first of the plurality of brake pedal position sensors and a signal received from a second of the plurality of brake pedal position sensors, wherein the processor is arranged to determine the characteristic at least partly on the basis of the determined comparison.

Optionally, the avionics unit is provided with a pre-set minimum value, and the characteristic is determined at least in part on the basis of a difference between a value determined based on a signal received from one of the plurality of brake pedal position sensors and the pre-set minimum value.

Optionally, the avionics unit comprises a pulse width modulator arranged to generate a pulse representing the characteristic.

A second aspect of the present invention provides a system comprising a first avionics unit, the first avionics unit being an avionics unit an according to any one of the preceding claims, and a second avionics unit, the second avionics unit being one of the one or more other avionics units, the second avionics unit being arranged to: receive a modulated signal from the first avionics unit; and decode, from the modulated signal, a characteristic of a present state of the avionics unit with respect to the fault condition.

Optionally, the predetermined time is a time after which, upon continuously receiving a signal having the first state from the first avionics unit, the second avionics unit determines a fault in the first avionics unit.

Optionally, the predetermined time is in the range of 100 ms to 5 s.

Optionally, the second avionics unit is arranged to perform an action based on the characteristic.

Optionally, the action is to provide a signal to be received at a health monitoring system arranged to record data corresponding with the characteristic.

Optionally, the first avionics unit is a backup brake control unit and the second avionics unit is a primary brake control unit.

Optionally, the second avionics unit is arranged to sample the modulated signal at a frequency corresponding with a period less than a duration of the first state.

Optionally, the second avionics unit is arranged to sample the modulated signal at a rate of approximately once every 2.5 ms.

A third aspect of the present invention provides method of communication between a first avionics unit and a second avionics unit, the first avionics unit comprising a communications interface arranged to interface with the second avionics unit to transmit a signal having a first state indicating a fault condition to the second avionics unit if the first state persists for a predetermined time, the method comprising generating a modulated signal at the communications interface, the modulated signal indicating a characteristic of a present state of the avionics unit with respect to the fault condition, the modulated signal comprising the first state and a second state, different from the first state, wherein, in the modulated signal, the first state has a duration less than the predetermined time.

A fourth aspect of the present invention provides an aircraft comprising an avionics unit according to the first aspect or a system according to the second aspect.

A fifth aspect of the present invention provides a computer program which, when executed by a processor in a first avionics unit, the first avionics unit comprising a communications interface arranged to interface with the second avionics unit to transmit a signal having a first state indicating a fault condition to the second avionics unit if the first state persists for a predetermined time, causes the processor to generate a modulated signal at the communications interface, the modulated signal indicating a characteristic of a present state of the avionics unit with respect to the fault condition, the modulated signal comprising the first state and a second state, different from the first state, wherein, in the modulated signal, the first state has a duration less than the predetermined time.

BRIEF DESCRIPTION OF THE DRAWINGS

Embodiments of the invention will now be described, by way of example only, with reference to the accompanying drawings, in which.

DETAILED DESCRIPTION

Figure 1:
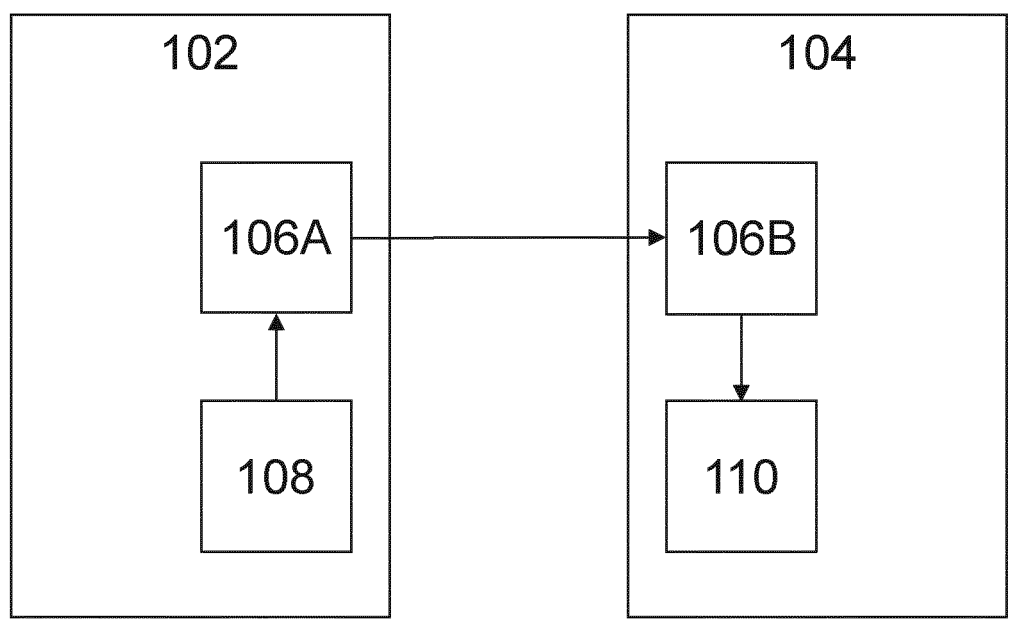
FIG. 1 is a schematic diagram showing a system comprising a first avionics unit and a second avionics unit according to an embodiment.

FIG. 1 illustrates an avionics system 100. The system 100 in the example shown in FIG. 1 comprises two avionics units: a first avionics unit, referred to as unit A 102, and a second avionics unit, referred to as unit B 104. However, in other examples, the avionics system 100 may be a network of more than two avionics units.

Unit A 102 may, in some examples, act as a backup to unit B 104. That is, unit B 104 may be a primary avionics unit for providing a function in an aircraft and unit A 102 may provide the same or a similar function if unit B 104 fails. In this sense, unit A 102 may be considered a backup unit and unit B 104 may be considered a primary unit.

The embodiments herein are described with reference to example avionics units that control wheel brakes; however, the present invention is not limited to wheel brake systems and is applicable to any type of avionics unit.

In other examples, the system 100 may comprise avionics units arranged to monitor or control other aircraft functions. For example, the system 100 may comprise avionics units arranged to monitor and/or control the state of aircraft landing gear.

Unit A 102 has a communications interface 106 arranged to interface with other avionics units. In the example shown in FIG. 1, the communications interface 106A of unit A 102 is arranged to interface with a communications interface 106B of unit B 104. The communication interface 106A of unit A 102 is arranged to transmit a discrete signal indicating a fault condition of unit A 102 to unit B 104, received at the communications interface 106B of unit B 104 (and, in some examples, to other avionics units). The discrete signal is interpreted as indicating a fault condition if the fault condition persists for a predetermined time. For example, the discrete signal may be a binary signal indicating a fault condition and may be determined as indicating a fault condition by unit B 104 if the discrete signal indicating the fault condition persists for 250 ms, or some other appropriate time.

Unit A 102 comprises a processor 108. In legacy avionics units, the processor 108 may be programmed to generate a binary output at the communications interface 106A of unit A 102 if the processor 108 determines a fault condition in unit A 102. For example, the processor 108 may generate a binary 1 output if it determines that unit A 102 is operating within normal parameters and may generate a binary 0 output if it determines that unit A 102 is not operating within normal parameters and has therefore become faulty. In other examples, a binary 0 signal may indicate normal operation and a binary 1 signal may indicate a fault.

Conventionally, to allow for transmission of data indicating how close an avionics unit is to reach a failure condition, additional communications interfaces and/or data transmission paths would be added to support transmission of this additional data. This may involve replacing existing avionics units with redesigned avionics units that include additional data connections and possibly installing additional wiring infrastructure connecting the redesigned avionics units with other avionics units (which may also have to be upgraded).

In the embodiment described with reference to FIG. 1, the processor 108 is further arranged to modulate an output at the communication interface to provide a modulated signal to indicate a characteristic of a present state of the avionics unit with respect to the fault condition. The modulated signal comprises a first state corresponding to a state indicating a fault condition. The first state has a duration that is less than the predetermined time after which unit B 104 (and/or other avionics units) is programmed to determine that a fault condition exists in unit A 102. The modulated signal also has a second state different to the first state.

Unit B 104 also has a processor 110. The processor 110 may be arranged to receive and process signals transmitted by unit A 102. In one example, the processor 110 of Unit B 104 is arranged to determine whether signals received from Unit A 102 indicating a fault condition have persisted for a certain time. If the processor 110 of Unit B 104 determines that signals received from Unit A 102 indicating a fault condition (i.e. in the first state) have persisted for a certain time, the processor 110 of unit B 104 is arranged to provide a fault signal to another avionics unit, which may, for example, display an error message on a cockpit display to the pilot of the aircraft.

Figure 2:
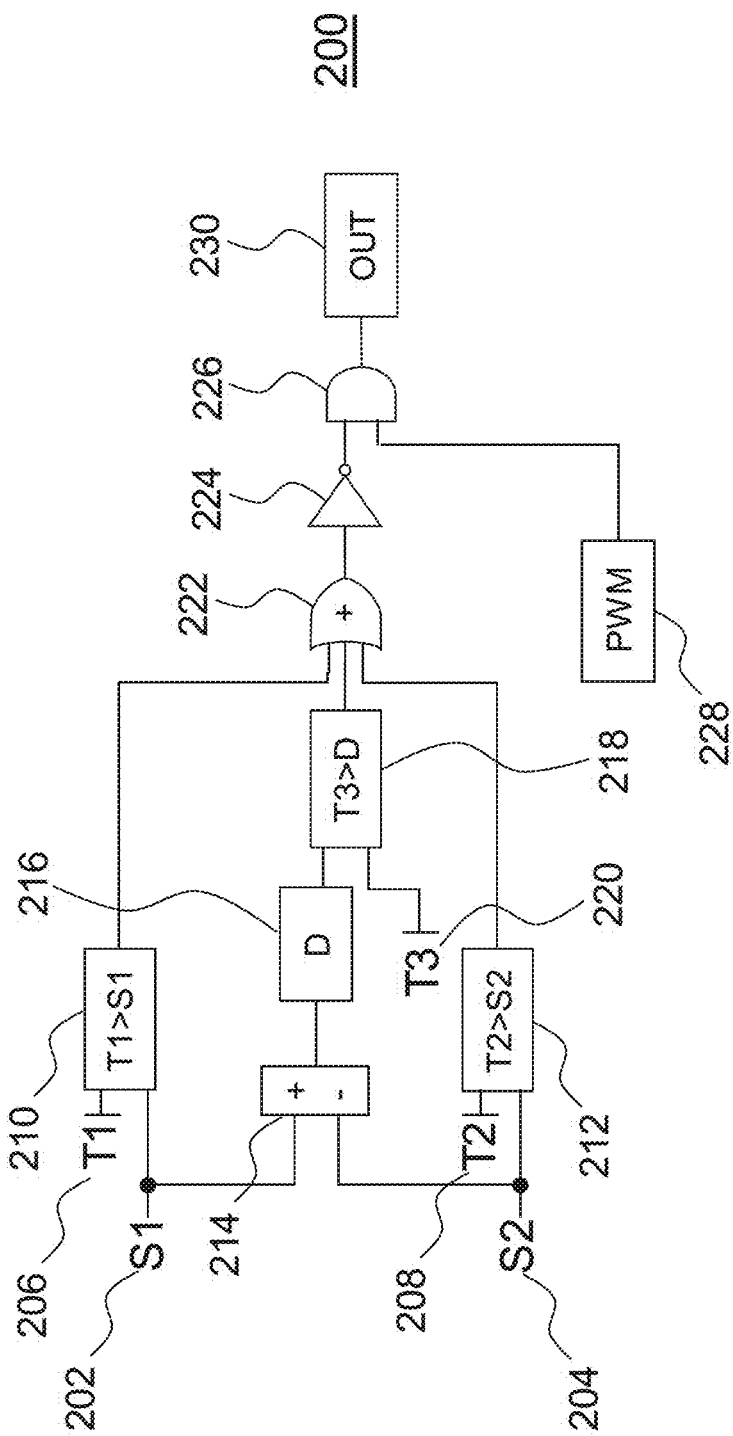
FIG. 2 is a schematic diagram showing a logic component for use in a an embodiment.

For example, the processor 108 of Unit A 102 execute a computer program arranged to implement the logic 200 shown in FIG. 2. The example shown in FIG. 2 shows the logic for the example brake system described above. In this example, the logic shown is for interpreting position sensor outputs for a single brake pedal in an aircraft (for example the left brake pedal, operable by the pilot). In implementations of the present invention, the processor 108 may apply the same or similar logic to position sensor outputs for the right pedal operable by the pilot and possibly also for position sensor outputs for left and right brake pedals operable by a co-pilot.

As shown in relation to the example shown in FIG. 2, the brake pedal may be provided with position sensors, each providing redundancy for the other. A first sensor provides a first sensor signal S1 202 and a second sensor provides a second sensor signal S2 204.

The sensor signals S1 202 and S2 204 provide a signal proportional to a displacement of the brake pedal (i.e. the amount by which a brake pedal is moved by a pilot). For example, the sensors may provide an output voltage proportional to the displacement of the brake pedal.

In some examples, the sensors may be arranged to provide a maximum voltage (e.g. 10V) when the brake pedal is set to its maximum displacement and to provide a minimum voltage (i.e. 0 V) when the brake pedal is set to its minimum displacement. However, in the example depicted in FIG. 2, in normal operation, the sensors are arranged to provide minimum sensor outputs S1 and S2 (202, 204) at values higher than 0 V for normal operation. For example, the sensors may be arranged to provide a voltage of 1.5 V when the brake pedals are set at their minimum displacement.

In the logic 200 shown in FIG. 2, each of the sensor signals S1 202 and S2 204 are compared with respective threshold values T1 206 and T2 208. T1 206 and T2 208 may be the same value or may be different values. For example, the values of T1 206 and T2 208 may be set to 1 V of the maximum output of the sensors S1 202 and S2 204.

Comparison between the value output by sensor S1 202 and its corresponding threshold T1 206 is performed by a first comparator 210. Comparison between the value output by sensor S2 204 and its corresponding threshold T2 208 is performed by a first comparator 212.

Each of the first and second comparators 210, 212 is arranged to determine whether the value of the signal (S1 or S2) 202, 204 output by its respective sensor is less than the respective threshold value (T1 or T2) 206, 208. The threshold values T1 206 and T2 208 are set to be at least as low (and in some examples lower) than the minimum values (i.e. S1 202 and S2 204) that the sensors are arranged to output at minimum displacement of the brake pedal. For example, if the sensors are arranged such that the minimum values of the signals S1 202 and S2 204 (i.e. with no displacement of the brake pedals) is set to 1.5 V, then the threshold values T1 206 and T2 208 may be set to 1.0 V. Accordingly, the comparators 210 and 212 are arranged to provide an indication that one or other or both of the sensors has failed (since in normal operation, the signals S1 202 and S2 204 should not fall below their respective threshold values T1 206 and T2 208).

The logic 200 shown in FIG. 2 also provides for a further check regarding the status of the sensors monitoring the position of the brake pedal by comparing the signals S1 202 and S2 204 with respect to each other. To provide this further check, the logic 200 includes a subtractor 214, which determines a difference between the magnitude of S1 202 and the magnitude S2 204. To remove any influence from the sign (i.e. whether the difference is positive or negative with respect to either of the signals S1 202 and S2 204), the logic may include an "absolute" component, referred to hereinafter as a difference component 216 arranged to determine an absolute difference between S1 202 and S2 204 (i.e. so that the logic is indifferent to whether the magnitude of the signal from the first sensor, S1 202, is greater or less than the magnitude of signal from the second sensor S2 204).

The output from the difference component 216 is compared by a third comparator 218 with a third threshold value T3 220. The third threshold value specifies a value corresponding with an acceptable difference between the first and second sensors. If there is a significant difference between the outputs S1 202 and S2 204, then it is likely that at least one of the sensors providing those signals S1 202, S2 204 is faulty because the sensors are measuring the same parameter and should therefore produce the same output in normal operation.

The third threshold value T3 320 may be determined based on the tolerances of the first and second sensors. The tolerance of a sensor may be, for example, defined as a percentage of the maximum output of the sensor. For example, if each of the first and second sensors has a maximum output of 10 V, and a specified tolerance of 1%, each sensor, operating normally, would produce an output that is accurate to within ±0.1 V. Therefore, when operating normally, the maximum difference between the outputs of the first and sensors would be a maximum of 0.2V. Furthermore, there may be discrepancies due to installation tolerances (for example, the sensors may not be perfectly aligned with the brake pedal). To take account of such installation tolerances, the third threshold value T3 220 may include an additional margin above the maximum difference between the outputs of the first and second sensors. In one example, the third threshold value T3 220 may be set at a difference of 0.6 V between the signal S1 202 from the first sensor and the second signal S2 204 of the second sensor.

The outputs from the comparators 210, 212, 218 are received at an OR gate 222, which is arranged to determine if there is a fault with any of the sensors based on: a difference between either of the sensors (for a given brake pedal) and a corresponding predetermined minimum value (in some cases, with some margin of error) or a difference between the outputs of each of the sensors exceeding a predetermined allowed difference. In other words, any of the above failure modes can result in the logic producing a signal indicating a failure.

Typically, in data transmitting systems applied to avionics, failures are denoted by a binary 0 and normal operation is denoted by a binary 1. The reason for this is to avoid confusion between systems that are operating normally but inactive and systems that are malfunctioning.

In the logic 200 described with FIG. 2, this convention is adhered to. However, in order to provide a signal compatible with modifications to the logic 200 (described below) that enable provision of a modulated signal to unit B 104 to indicate a characteristic of a present state of unit A 102 with respect to a fault condition of unit A 102, if no fault condition of unit A 102 is determined is determined, the logic 200 comprises a NOT gate 224 to invert the binary signal output by the OR gate 222. Furthermore, the logic 200 comprises an AND gate 226 which receives an input from the NOT gate 224 and a frequency and pulse width modulator, hereinafter referred to as the modulator 228, that is arranged to a provide a modulated pulse, in which the frequency and/or duty cycle of a pulse can be modulated, to correspond to a modulated signal to indicate a characteristic of a present state of unit A 102 to unit B 104 with respect to the fault condition. For example, a characteristic of the pulse may be proportional to a difference between the present state of unit A 102 and a state that would be considered a failure condition. The characteristic of the pulse may be, for example, a duration for which the pulse is in a low state (e.g. 0V), the period of the pulse, or a duty cycle of the pulse (i.e. the relative durations for which the pulse in a high or low state).

That is, the modulated signal indicating a characteristic of a present state of the avionics unit with respect to the fault condition, is only transmitted if a fault condition is not present (i.e. has not been determined by the logic 200)

The AND gate 226 compares the input from the modulator 228 and the output from the NOT gate 224 (which is indicative of a fault with either of the sensors) to provide an output that will be either a failure condition or comprise a modulated signal indicating a characteristic of a present state of the avionics unit with respect to the fault condition.

In other examples, the NOT gate 224 could be omitted and the AND gate 226 may be replaced with an OR gate, to provide the same logical outcome, provided that the fault condition is defined with a "true" output and that the modulation is inverted. It will be understood that other constructions of logical gates that provide the same logical output are possible.

In some examples, as shown in FIG. 2, the presence of any of the failures identified by the previously described logic 200 may result in the processor 108 determining that there is a sensor failure, accordingly prompting the processor 108 to indicate a fault which may be acted upon by another avionics unit, such as unit B 104 described above with reference to FIG. 1. If the processor 108 determines that no such failure is present it will then still provide a modulated signal indicating a margin to failure which can be received by unit B 104.

Figure 3:
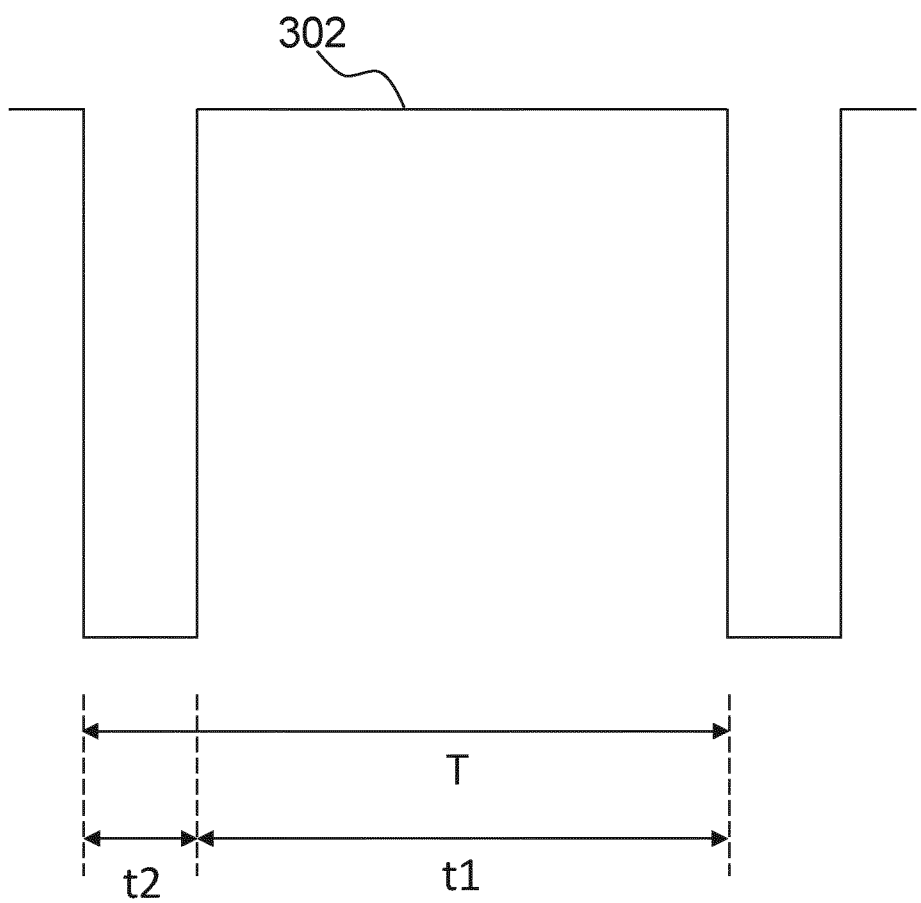
FIG. 3 is a schematic diagram showing an encoding scheme for use with an embodiment.

FIG. 3 is a schematic diagram illustrating a pulse scheme 300 which may be implemented to transmit data via the discrete communication interface 106A of Unit A 102 to the communication interface 106B of unit B 104.

The logic 200 described above with reference to FIG. 2 identifies two modes of failure relating to the two sensors associated with the brake pedal position. The first of those is an absolute failure determined on the basis of the value provided by the sensor being less than some value set higher than the lowest expected value and the second is a discrepancy between the two sensors (which if operating normally should return the same value).

Returning to FIG. 1, the processor 110 of unit B 104 is arranged to determine if the fault condition persists for a predetermined time. If the fault condition persists for a predetermined time, the processor 110 of unit B 104 may be arranged to report a failure condition of unit A 102 (in addition to any failure condition of unit B 104, for example) to, for example, provide a warning indication that is presented in the cockpit and/or store data recording the fault that can be retrieved by maintenance staff once the aircraft has landed.

FIG. 3 shows an example of a modulation signal 302 suitable for encoding a characteristic of a present state of the avionics unit 102 with respect to a fault condition.

As shown in FIG. 3, the waveform 302 has a period, T. The period T of the waveform may be set according to capability of the communications interface 106. For example, the communications interface may comprise a switching means such as a transistor or a physical switch that is limited to a certain switching rate. The period T may be set to be correspond with a frequency below that switching rate.

As shown in FIG. 3, for a given period T, the waveform 302 has a low state (i.e. binary 0) having a duration t2 and a high state (i.e. binary 1) having a duration t1. For example, as shown in FIG. 3, there is a duration t2, which is a proportion of the period T, in which the waveform 302 is in a low state. Duration t2 is a time for which the modulator 228 modulates the output of the communications interface 106A to be in the first state. The duration t1 represents a second state different from the first state. Duration t2 is less than the predetermined time for which the processor 110 of unit B 104 is programmed to require the signal (in the first state) transmitted via the communications interface 106 of unit A 102 to persist before reporting a fault in unit A 102.

The durations t1 and t2 can be adjusted by the processor 108 to encode information relating to the present state of the avionics unit with respect to the fault condition.

For example, the time t2 (i.e. the duration during which the modulated signal is in the first state) can be adjusted to correspond with (i.e. be proportional to) the difference between the magnitude of the signal S1 202 or the magnitude the signal S2 204 and the corresponding threshold values T1 206 and T2 208. For example, the duration t2 may be adjustable in a predetermined range, with the minimum value of the range corresponding to zero difference between the magnitude of the signal S1 202, S2 204 of either sensor and its corresponding threshold T1 206, T2 208 and the maximum value of the range corresponding with a difference between the magnitude of the signal S1 202, S2 204 of either sensor and its corresponding threshold T1 206, T2 208 being equivalent to a difference that triggers the fault condition.

In practice the sensors providing the signals S1 202 and S2 204 may be provided in a single physical unit and therefore if either sensor fails both are replaced. Therefore, the logic 200 described above with reference to FIG. 2 may be arranged to act based on the largest discrepancy between a signal S1 202, S2 204 and its corresponding threshold value T1, 206, T2, 208.

In this example, t1 can be similarly adjusted to correspond with (i.e. be proportional to) the difference between the signals S1 202 and S2 204.

In some examples, the duration t2 (i.e. the first state) cannot exceed (i.e. be longer than) the predetermined time after which unit B 104 determines that there is a fault condition in unit A 102. Furthermore, t2 cannot be shorter that the time frame at which the processor 110 of unit B 104 samples measurements received at its communications interface 106B, since otherwise such signal would not be seen by the processor 110 of unit B 104. For example, t2 may have a minimum value of 7.5 ms, which corresponds with three cycles of the processor 110 (each taking 2.5 ms), to ensure detection of the signal provided in the duration t2.

In some examples, the minimum value of t2 is 7.5 ms and the maximum value of t2 is 150 ms.

In an alternative example, the duration t1 may correspond to the first state and may be adjusted to correspond with (i.e. be proportional to) the difference between one or more of the signals S1 202 and S2 204 and the corresponding threshold values T1 206 and T2 208, and the duration t2 may be adjusted to correspond with (i.e. be proportional to) the difference between the signals S1 202 and S2 204.

In some examples, the modulated signal may repeat over multiple periods and the values of t1 and t2 may change from one period to another to indicate a change in the characteristic of a present state of the avionics unit with respect to the fault condition. For example, the value of t1 or t2 may change from one period to the next to indicate that the present state of the avionics unit is moving towards a failure condition.

Figure 4:
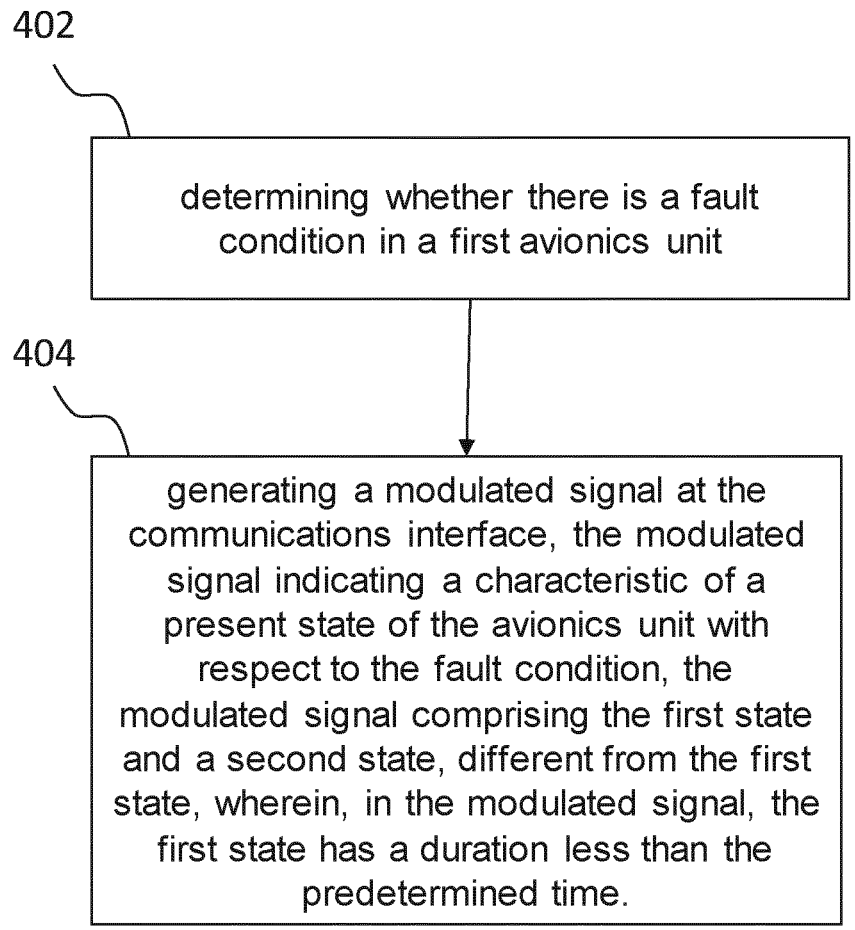
FIG. 4 is a flow diagram of a method of communication between a first avionics unit and a second avionics unit according to an embodiment.

FIG. 4 is a flow diagram illustrating a method 400 of communication between a first avionics unit and a second avionics unit. For example, the first avionics unit may correspond to unit A 102 and the second avionics unit may correspond to unit B 104, as described above with reference to FIG. 1.

The first avionics unit comprising a communications interface arranged to interface with the second avionics unit to transmit a discrete signal indicating a fault condition to the second avionics unit, the discrete signal indicating a fault condition if the fault condition persists for a predetermined time At block 402, a determination is made as to whether there is a fault condition in the first avionics unit. If there is a fault condition present in the first avionics unit, the communication interface will transmit a discrete signal indicating the fault condition to a second avionics unit if the discrete signal persists for a predetermined time.

At block 404, in response to determining that is no fault condition in the first avionics unit, a modulated signal is generated at the communications interface. The modulated signal indicates a characteristic of a present state of the avionics unit with respect to the fault condition and comprises a first state corresponding to the state of the discrete signal and a second state, different from the first state, wherein the first state has a duration less than the predetermined time.

The characteristic may be a measure of a separation between the present state of the avionics unit and the fault condition, the present state being a state between a perfectly working component and a failed component. For example, the measure may be represented by the duration t1 of the modulated signal, which may be proportional (between a zero value representing a perfectly working component and a maximum value representing a failed component) to the present state with respect to the fault condition The measure and, therefore the characteristic, may, in some examples, be based on a voltage or current output by one or more sensors arranged to monitor a component of the aircraft, such as the brake pedal position sensors described above. Data representing the characteristic may be recorded and processed and/or transmitted for processing, as required, to determine trends in the characteristic.

The method 400 described above with reference to FIG. 4 may be implemented by a processor such as the processor 108 of unit A 102 described above with reference to FIG. 1. For example, the processor may be arranged to execute a computer program which causes the processor to implement the method 400 described with reference to FIG. 4.

Figure 5:
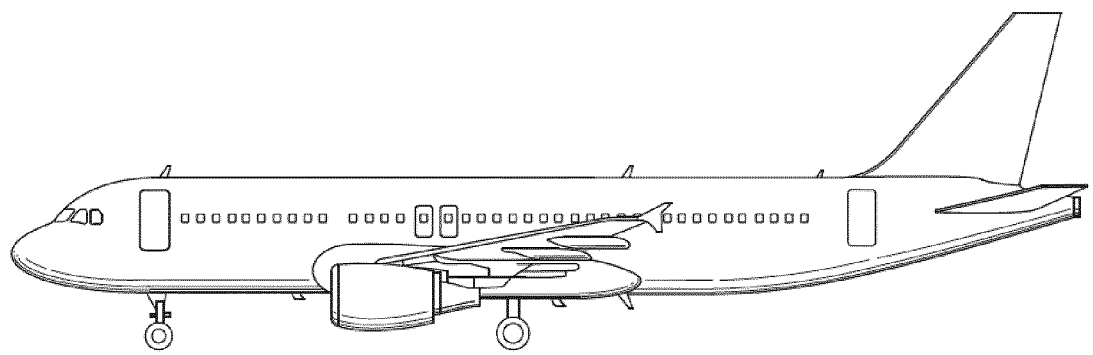
FIG. 5 is an aircraft according to an embodiment.

In some embodiments, the avionics system 100 or the avionics unit 102 described above with reference to FIG. 1 may be installed in an aircraft. Referring to FIG. 5, there is shown a schematic front view of an example of an aircraft 500 according to an embodiment of the invention. The aircraft 500 may comprise one or more avionics systems or avionics units such as the avionics system 100 or the avionics unit 102 described above with reference to FIG. 1.

The above embodiments are to be understood as illustrative examples of the invention. Further embodiments of the invention are envisaged. For example, the system 100 may comprise avionics units arranged to monitor or control other aircraft functions. For example, the system 100 may comprise avionics units arranged to monitor and/or control the state of aircraft landing gear. In such examples, the system may comprise one or more sensors (such as inductive sensors) arranged to detect a proximity of a landing gear assembly from a metallic target. Such a system may be arranged so that when the aircraft is in the air, and the landing gear is uncompressed, the metallic target is in relatively close proximity to the sensor and the sensor detects a relatively high signal, whereas when the aircraft is on the ground and the landing gear is compressed, the metallic target is displaced away from the sensor and the resulting signal is reduced below a threshold value. Accordingly, the system 100 may determine the integrity of sensors arranged to determine whether the landing gear is in a compressed state indicating that the aircraft is on the ground, or in an uncompressed state indicating that the aircraft is airborne.

In normal operation the landing gear is intended to be in either a compressed or uncompressed state. In either of the compressed or uncompressed states, a sensor may indicate a fault if the output of the sensor is in a first state indicating a fault condition (for example if the sensor is more or less than a threshold distance from the metallic target) and if the first state persists for a predetermined time. However, prior to the predetermined time being reached, the system 100 may provide a modulated signal similar to that described above with reference to FIG. 3, comprising the first state and a second state, different from the first state, wherein, in the modulated signal, the first state has a duration less than the predetermined time. For example, the modulated signal may indicate a characteristic of a present state of the avionics unit with respect to the fault condition, such as a separation between the present state of the avionics unit and the fault condition. In one example, the modulated signal may indicate that the separation between the metallic target and the sensor as measured by the sensor has not reached a threshold value indicating a fault condition, but that the separation is nonetheless different from an expected value for the compressed or uncompressed state of the landing gear. Such a measurement by the sensor may indicate a displacement of the sensor and/or target from a nominal position, meaning that maintenance is required, for example.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

It is to be noted that the term "or" as used herein is to be interpreted to mean "and/or", unless expressly stated otherwise.

The invention claimed is:

1. An avionics unit comprising:
 a communications interface arranged to interface with one or more other avionics units, the communication interface arranged to transmit a discrete signal having a first state, wherein the discrete signal indicates a fault condition of the avionics unit to the one or more other avionics units if the first state persists for a predetermined time; and
 a processor arranged to modulate an output at the communication interface to provide a modulated signal to indicate a characteristic of a present state of the avionics unit with respect to the fault condition, the modulated signal comprising the first state and a second state, different from the first state, wherein, in the modulated signal, the first state has a duration less than the predetermined time.

2. The avionics unit according to claim 1, wherein the predetermined time is a time after which, upon continuously receiving a signal having the first state, the one or more other avionics units is arranged to perform an action in response to the fault condition.

3. The avionics unit according to claim 1, wherein the characteristic is a measure of a separation between the present state of the avionics unit and the fault condition.

4. The avionics unit according to claim 3, wherein the measure indicates a time between a present time and a time at which a fault condition is expected to occur.

5. The avionics unit according to claim 1, wherein the avionics unit is arranged to receive signals from a plurality of a brake pedal position sensors, and the characteristic is determined based on a comparison between a signal received from a first of the plurality of brake pedal position sensors and a signal received from a second of the plurality of brake pedal position sensors, wherein the processor is arranged to determine the characteristic at least partly based on the determined comparison.

6. The avionics unit according to claim 1, wherein the avionics unit is provided with a pre-set minimum value, and the characteristic is determined at least in part based on a difference between a value determined based on a signal received from one of the plurality of brake pedal position sensors and the pre-set minimum value.

7. The avionics unit according to claim 1, further comprising a pulse width modulator arranged to generate a pulse representing the characteristic.

8. A system comprising a first avionics unit, the first avionics unit being the avionics unit an according to claim 1, and a second avionics unit, the second avionics unit being one of the one or more other avionics units, the second avionics unit being arranged to:
   receive a modulated signal from the first avionics unit; and
   decode, from the modulated signal, a characteristic of a present state of the avionics unit with respect to the fault condition.

9. The system according to claim 8, wherein the predetermined time is a time after which, upon continuously receiving a signal having the first state from the first avionics unit, the second avionics unit determines a fault in the first avionics unit.

10. The system according to claim 9, wherein the predetermined time is in the range of 100 ms to 5 s.

11. The system according to claim 8, wherein the second avionics unit is arranged to perform an action based on the characteristic.

12. The system according to claim 11, wherein the action is to provide a signal to be received at a health monitoring system arranged to record data corresponding with the characteristic.

13. The system according to claim 8, wherein the first avionics unit is a backup brake control unit and the second avionics unit is a primary brake control unit.

14. The system according to claim 8, wherein the second avionics unit is arranged to sample the modulated signal at a frequency corresponding with a period less than a duration of the first state.

15. The system according to claim 14, wherein the second avionics unit is arranged to sample the modulated signal at a rate of once every 2.5 ms.

16. A method of communication between a first avionics unit and a second avionics unit, the first avionics unit comprising a communications interface arranged to interface with the second avionics unit to transmit a signal having a first state indicating a fault condition to the second avionics unit if the first state persists for a predetermined time,
   the method comprising:
      generating a modulated signal at the communications interface, the modulated signal indicating a characteristic of a present state of the avionics unit with respect to the fault condition, the modulated signal comprising the first state and a second state, different from the first state, wherein, in the modulated signal, the first state has a duration less than the predetermined time.

17. An aircraft comprising the avionics unit according to claim 1.

18. A computer program which, when executed by a processor in a first avionics unit, the first avionics unit comprising:
      a communications interface arranged to interface with the second avionics unit to transmit a signal having a first state indicating a fault condition to the second avionics unit if the first state persists for a predetermined time, causes the processor to generate a modulated signal at the communications interface, the modulated signal indicating a characteristic of a present state of the avionics unit with respect to the fault condition, the modulated signal comprising the first state and a second state, different from the first state, wherein, in the modulated signal, the first state has a duration less than the predetermined time.

* * * * *